US012725584B2

(12) United States Patent
Matsumura

(10) Patent No.: US 12,725,584 B2
(45) **Date of Patent: *Sep. 1, 2026**

(54) LIQUID CRYSTAL DISPLAY DEVICE

(71) Applicant: Magnolia White Corporation, Tokyo (JP)

(72) Inventor: Kazune Matsumura, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/069,399

(22) Filed: Mar. 4, 2025

(65) Prior Publication Data

US 2025/0201207 A1 Jun. 19, 2025

Related U.S. Application Data

(63) Continuation of application No. 18/372,733, filed on Sep. 26, 2023, now Pat. No. 12,272,330.

(30) Foreign Application Priority Data

Sep. 30, 2022 (JP) ................................ 2022-157884

(51) Int. Cl.
*G09G 3/36* (2006.01)
*G02F 1/1362* (2006.01)
*G02F 1/1368* (2006.01)

(52) U.S. Cl.
CPC ..... *G09G 3/3648* (2013.01); *G02F 1/136286* (2013.01); *G02F 1/1368* (2013.01); *G09G 2300/0426* (2013.01); *G09G 2320/0247* (2013.01); *G09G 2340/0435* (2013.01)

(58) Field of Classification Search
CPC ................ G09G 3/3648; G02F 1/1368; G06F 2300/0426
USPC .................................................... 345/87, 212
See application file for complete search history.

(56) References Cited

U.S. PATENT DOCUMENTS 8,253,670 B2 * 8/2012 Ono ..................... G09G 3/3648 345/87
9,905,178 B2 * 2/2018 Harada ................ G09G 3/3655
10,969,641 B2 * 4/2021 Suzuki .............. G02F 1/133345
2010/0201653 A1 * 8/2010 Saitoh ...................... G09G 3/36 345/204
2012/0200818 A1 * 8/2012 Lee ................... G02F 1/136286 349/143

(Continued)

*Primary Examiner* — Calvin C Ma
(74) *Attorney, Agent, or Firm* — Michael Best & Friedrich LLP

(57) ABSTRACT

In a liquid crystal display device, scanning lines, video signal lines and pixels are formed in respective regions enclosed by the scanning lines and the video signal lines. In the liquid crystal display device, a pixel electrode and a thin-film transistor (TFT) are formed in each of the pixels, a first insulating film is formed between a common electrode formed in common for a plurality of pixels and the pixel electrode, the pixel electrode is connected to one of the video signal lines via the TFT, the TFT has a gate connected to one of the scanning lines, a constant common voltage is supplied to the common electrode, the scanning lines are sequentially scanned from a first scanning line in one frame, and a predetermined voltage is applied for a predetermined period to all the scanning lines before a scanning signal is applied to the first scanning line.

7 Claims, 7 Drawing Sheets

(56) References Cited

U.S. PATENT DOCUMENTS

2015/0332650 A1* 11/2015 Saitoh .................. G09G 3/3685
345/204
2017/0186382 A1* 6/2017 Chen ..................... G02F 1/1368
2018/0024386 A1* 1/2018 Kim ...................... G02F 1/0123
349/36

* cited by examiner

Frame frequency : 90Hz
Frame period (t2) : 11,111ms

| | t3 (ms) | t3/t2 (%) |
|---|---|---|
| A | 0 | 0 |
| B | 0.05 | 0.45 |
| C | 1.00 | 9.00 |

LIQUID CRYSTAL DISPLAY DEVICE

CROSS-REFERENCE TO RELATED APPLICATIONS

This application is a continuation of U.S. patent application Ser. No. 18/372,733 filed on Sep. 26, 2023. Further, this application claims priority from Japanese patent application JP2022-157884 filed on Sep. 30, 2022, the contents of which are hereby incorporated by reference into this application.

BACKGROUND

The present invention relates to a liquid crystal display device and a method for driving the liquid crystal display device.

For the liquid crystal display device, viewing angle characteristics are an issue, and the In Plane Switching (IPS) type is widely used because it provides excellent viewing angle characteristics. In the IPS type, the Fringe Field Switching (FFS) type is particularly widely used because it can relatively increase pixel transmittance. Application of the liquid crystal display device has been extended in various fields.

Some display devices require high screen resolution and high-speed response. Such display devices often have a problem of flicker. JP 2019-184638 A and WO2014/092012 describe such a flicker phenomenon and countermeasures against the flicker phenomenon. JP 2019-184638 A describes a configuration in which an auxiliary electrode is formed on the counter substrate side in a liquid crystal display device of the FFS type. WO2014/092012 describes a configuration in which amplitude of a video signal is controlled to reduce flicker. In JP 2019-78979 A, although there is no description on flicker, it is described that a predetermined voltage is applied to all scanning lines at the beginning of each field to reduce amplitude of gate voltage in common inversion driving.

SUMMARY

In the liquid crystal display device, an image is formed by controlling an alignment direction of liquid crystal molecules by applying a voltage between a pixel electrode and a common electrode. In other words, a video signal is supplied to each pixel and held for one frame. On the other hand, a constant voltage is supplied to the common electrode. If the voltage cannot be held for one frame between the pixel electrode and the common electrode, flicker occurs.

Various driving methods have been devised for the liquid crystal display device depending on types of the display device. A liquid crystal display device used for a Virtual Reality (VR) display device and the like requires high resolution and high-speed response. In such a liquid crystal display device with high resolution and high image quality, flicker is conspicuous.

An object of the present invention is to achieve a method for driving a liquid crystal display device so that flicker can be reduced.

The invention overcomes the above-described problems, and provides specific approaches as in the following.

(1) In a liquid crystal display device, scanning lines extend in a first direction and are arranged in a second direction, video signal lines extend in the second direction and are arranged in the first direction, and pixels are formed in respective regions enclosed by the scanning lines and the video signal lines. In the liquid crystal display device, a pixel electrode and a thin-film transistor (TFT) are formed in each of the pixels, a first insulating film is formed between a common electrode formed in common for a plurality of pixels and the pixel electrode, the pixel electrode is connected to one of the video signal lines via the TFT, the TFT has a gate connected to one of the scanning lines, a constant common voltage is supplied to the common electrode, the scanning lines are sequentially scanned from a first scanning line in one frame, and a predetermined voltage is applied for a predetermined period to all the scanning lines before a scanning signal is applied to the first scanning line.

(2) In the liquid crystal display device described in (1), the predetermined period includes a period in which voltages of all the scanning lines are changed from a Low level of the scanning signal to the predetermined voltage, and a period in which the voltages of all the scanning lines are changed from the predetermined voltage to the Low level of the scanning signal.

(3) In the liquid crystal display device described in (1), the one frame is divided into an active period to scan the scanning lines and a blanking period to maintain data written to each pixel, and a backlight is ON during a portion of the blanking period.

(4) In the liquid crystal display device described in (1), the predetermined voltage corresponds to a signal at the same level as a High level of the scanning signal.

(5) In the liquid crystal display device described in (4), the predetermined period is 0.006% to 12% of a period of the one frame.

DESCRIPTION OF THE PREFERRED EMBODIMENTS

Although the present invention can be applied to general liquid crystal display devices, it is particularly effective in a high-resolution liquid crystal display device with the IPS type (FFS type), and thus the present invention will be described with such a liquid crystal display device. Hereinafter, the present invention will be described in detail with one embodiment.

First Embodiment

Figure 1:
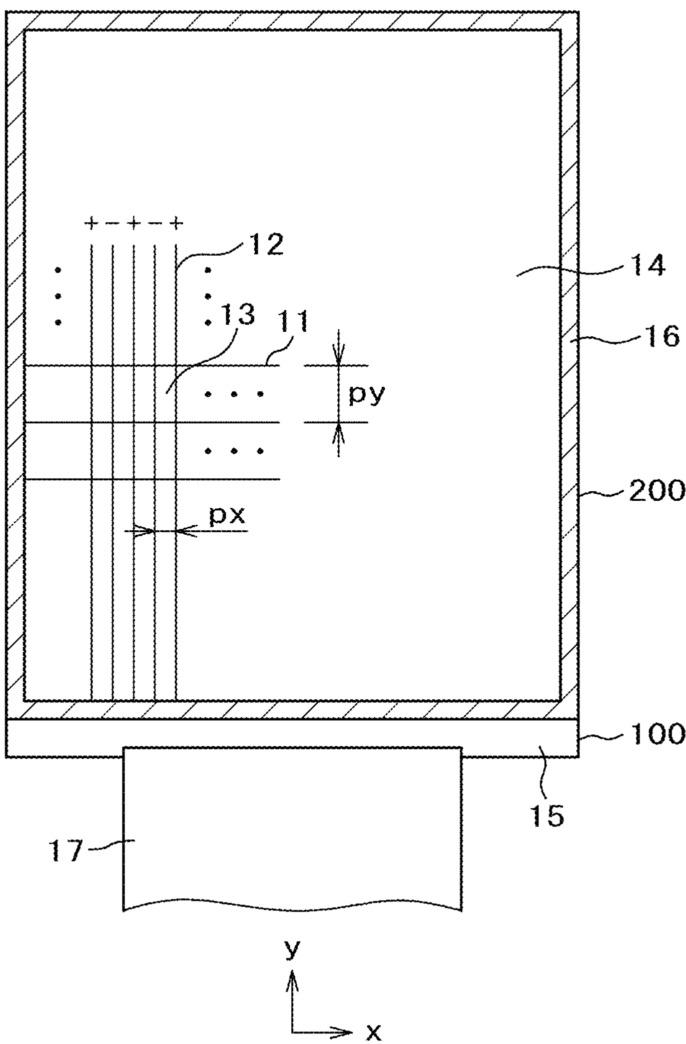
FIG. 1 is a plan view of a liquid crystal display device.

FIG. 1 is a plan view of a liquid crystal display device to which the invention is applied. In FIG. 1, a TFT substrate 100 and a counter substrate 200 are bonded together with a sealing material 16, and a liquid crystal layer is sandwiched between the TFT substrate 100 and the counter substrate 200. A display region 14 is formed in a portion where the TFT substrate 100 overlaps the counter substrate 200.

In the display region 14 of the TFT substrate 100, scanning lines 11 extend in the horizontal direction (x-axis direction) and are arranged in the vertical direction (y-axis direction). Video signal lines 12 extend in the vertical direction and are arranged in the horizontal direction. Respective regions enclosed by the scanning lines 11 and the video signal lines 12 form pixels 13. Although a pixel having such a configuration is sometimes called sub-pixel, such a pixel is referred to as pixel herein.

In this embodiment, pixel size is extremely small with a horizontal pitch px of 11 μm and a vertical pitch py of 33 μm. Such a small pixel pitch problematically causes interference between adjacent pixel electrodes. In the liquid crystal display device, polarities of respective potentials of the pixel electrode and the common electrode are regularly reversed to prevent electrolysis of the liquid crystal. Furthermore, so-called row inversion driving, column inversion driving, dot inversion driving, and the like have been developed to prevent such electrolysis of liquid crystal more reliably.

In this embodiment, as illustrated in FIG. 1, the column inversion driving method is used. Specifically, signal voltages of reverse polarities are supplied to respective adjacent video signal lines. The polarities periodically alternate. In the liquid crystal display device, liquid crystal molecules are driven by a potential difference between the pixel electrode and the common electrode. In addition, as illustrated in FIG. 1, potential difference between adjacent pixels is twice as large as the potential difference between the pixel electrode and the common electrode in the column inversion driving.

However, while the distance between the pixel electrode and the common electrode is 70 to 100 nm, the distance between adjacent pixels is 1 μm or more, and thus effect on the liquid crystal molecules is still dominated by an action between the pixel electrode and the common electrode. However, if the distance between pixel electrodes is reduced as described above, the effect by an action between adjacent pixel electrodes may not be negligible.

In FIG. 1, the TFT substrate 100 is formed larger than the counter substrate 200, and a portion where the TFT substrate 100 does not overlap the counter substrate 200 is formed as a terminal region 15. A flexible wiring board 17 is connected to the terminal region 15. A driver IC for driving the liquid crystal display device is mounted on the flexible wiring board 17. However, the driver IC may be mounted on the terminal region 15.

Since liquid crystal is not self-luminous, a backlight is disposed behind the TFT substrate 100. A liquid crystal display panel forms an image by controlling light from the backlight on a pixel-by-pixel basis. The flexible wiring board 17 is folded on the back of the backlight to reduce the external size of the liquid crystal display device as a whole.

Figure 2:
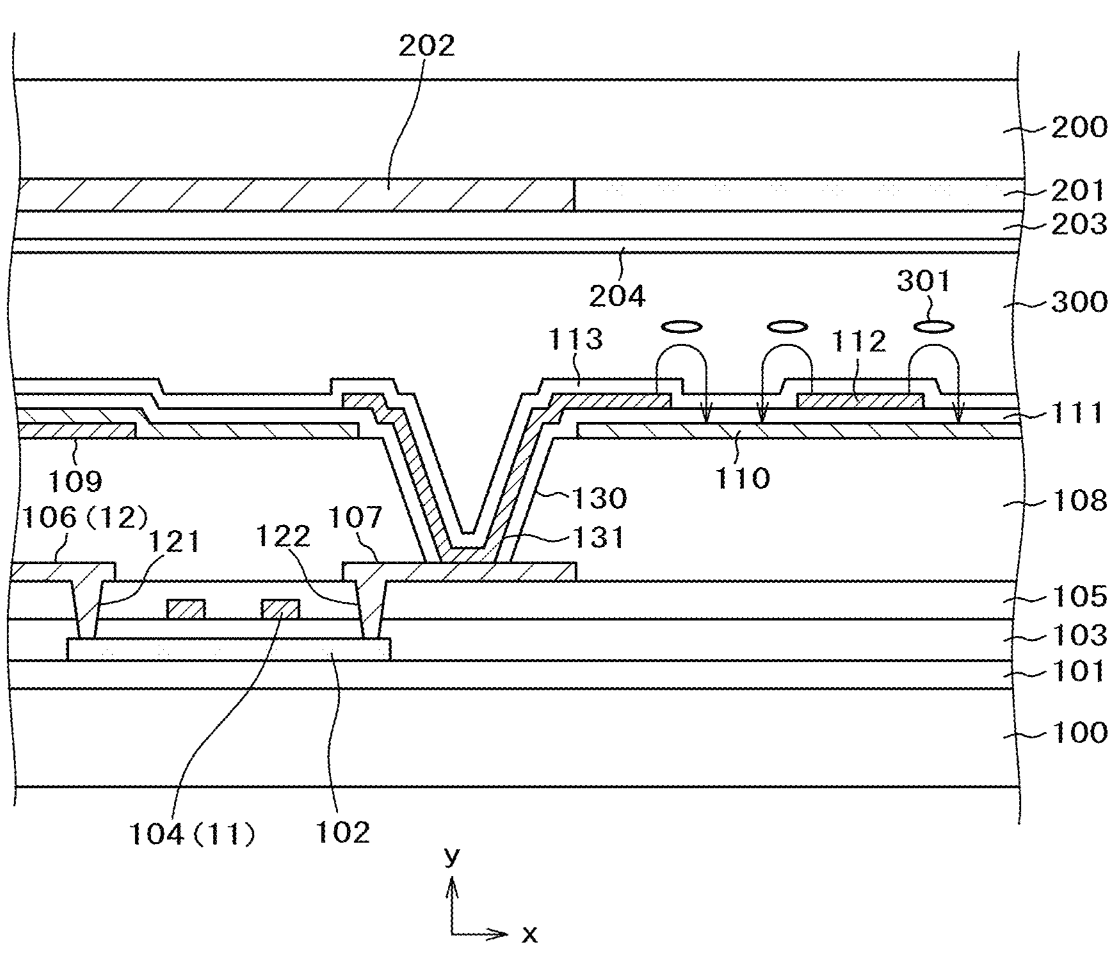
FIG. 2 is an exemplary cross-sectional view of a display region of the liquid crystal display device.

FIG. 2 is a cross-sectional view of a display region in which a pixel is located. FIG. 2 shows a liquid crystal display device of a type called Fringe Field Switching (FFS) mode belonging to In Plane Switching (IPS) mode.

In FIG. 2, a base film 101 is formed over the TFT substrate 100. The base film 101 prevents the semiconductor film 102 from being contaminated by impurities from the TFT substrate 100 formed of glass or a resin such as polyimide. The base film 101 is often formed of a stacked film of a silicon oxide (SiO) film and a silicon nitride (SiN) film.

A semiconductor film 102 for configuring TFT is formed on the base film 101. The semiconductor film 102 is, for example, a polysilicon semiconductor film 102, which is obtained by depositing amorphous silicon by CVD and converting the amorphous silicon into polysilicon with an excimer laser. The polysilicon semiconductor film is hereinafter simply referred to as semiconductor film 102. The semiconductor film 102 may include amorphous semiconductor or oxide semiconductor without being limited to polysilicon.

Figure 3:
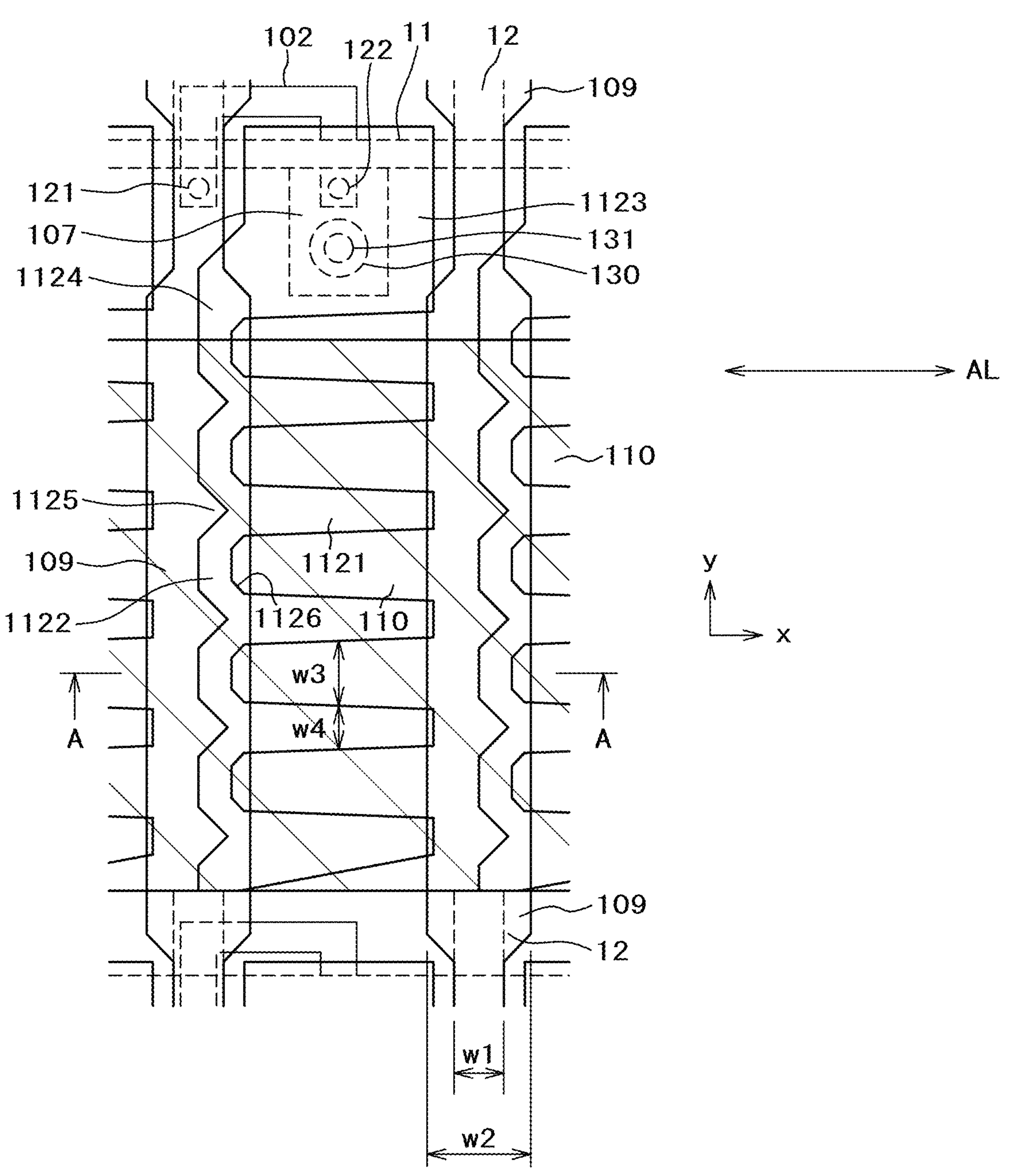
FIG. 3 is an exemplary plan view of a pixel.

A gate insulating film 103 is formed of a silicon oxide (SiO) film or a silicon nitride (SiN) film by covering the semiconductor film 102. Two gate electrodes 104 are formed in series on the gate insulating film 103. As shown in FIG. 3, the scanning line 11 also serves as the gate electrode 104. Specifically, two TFTs are formed in series by the semiconductor film 102 that passes under the scanning line 11 twice with the gate insulating film 103 in between.

In FIG. 2, an interlayer insulating film 105 is formed of a silicon oxide (SiO) film and/or a silicon nitride (SiN) film so as to cover the gate electrode 104 and the gate insulating film 103. A through hole 121 is formed in the interlayer insulating film 105 and the gate insulating film 103 to connect one end of the semiconductor film 102 to the video signal line 12. In FIG. 2, the video signal line 12 also serves as a drain electrode 106. A through hole 122 is formed in the interlayer insulating film 105 and the gate insulating film 103 to connect the other end of the semiconductor film 102 to a source electrode 107. The source electrode 107 extends towards a pixel electrode 112.

An organic passivation film 108 is formed of a transparent resin such as acrylic resin so as to cover the drain electrode 106, the source electrode 107, and the interlayer insulating film 105. The organic passivation film 108 also serves as a planarization film, and is formed thick, 2 μm or more, to reduce coupling between the video signal line 12 or the scanning line 11 and the common electrode 110 or the pixel electrode 112 formed on the upper side.

The semiconductor film 102, the gate electrode 104, the drain electrode 106, and the source electrode 107, which configure a thin-film transistor, are described as a top gate type with reference to FIG. 2. However, this is not limitative, and a bottom gate type in which the gate electrode is provided between the semiconductor film 102 and the TFT substrate 100, or a dual gate type in which the top gate type and the bottom gate type are combined so that the semiconductor film 102 is sandwiched between two upper and lower gate electrodes, may also be used.

In FIG. 2, a common electrode 110 is formed using a transparent conductive film, such as an indium tin oxide (ITO) film, on the organic passivation film 108. A capacitive insulating film 111 is formed of SiN over the common electrode 110. The capacitive insulating film is formed thin, for example, about 70 nm, to increase pixel capacitance. The pixel electrode 112 is formed of a transparent conductive film such as an ITO film on the capacitive insulating film 111.

In the organic passivation film 108, a through hole 130 is formed in a portion corresponding to the source electrode 107 that extends from the TFT, and a through hole 131 is formed in the capacitance insulating film 111 within the through hole 130. As a result, the pixel electrode 112 is connected to the source electrode 107. An alignment film 113 for initial alignment of liquid crystal is formed of a polyimide film over the pixel electrodes 112. Although alignment treatment of the alignment film 113 includes a rubbing method and a photo-alignment method that uses a polarized ultraviolet ray, since the IPS type (including the FFS type) requires no tilt angle, so-called photo-alignment, which causes anisotropy in the polyimide film by a polarized ultraviolet ray, is advantageous.

On the left side of FIG. 2, a light-shielding metal line 109 is formed on the upper side of the organic passivation film 108 at a position corresponding to the video signal line 12. A common voltage is supplied to the metal line 109. The main roles of the metal line 109 are to reduce resistance of the common electrode 110, shield backlight, connect the common electrodes which are formed in stripes along the horizontal direction (x-axis direction) for each pixel row as described later, together, and prevent potential gradient in the common electrode 110 and thus prevent luminance gradient. The metal line 109 may be made of the same metal material as the material forming the video signal line 12 or the scanning line 11 or made of a different metal material. For example, molybdenum-tungsten alloy (MoW) or a laminated film of Ti—Al—Ti (TAT) is used.

In FIG. 2, the counter substrate 200 is disposed opposite the TFT substrate 100 and across a liquid crystal layer 300. On the counter substrate 200, a black matrix 202 is formed so as to cover the through hole 130, the TFT, and the like formed on the TFT substrate 100 side, and a red, blue, or green color filter 201 is formed in a light transmission region, i.e., an image forming region. An overcoat film 203 is formed over the color filter 201 and the black matrix 202, and an alignment film 204 for initial alignment of the liquid crystal is formed on the overcoat film 203. A configuration of the color filter 201 is not limited to the configuration where the color filter is provided on the counter substrate 200, but may be Color filter On Array (COA) where the color filter is provided on the TFT substrate 100. A method for manufacturing the alignment film 204 is as described for the alignment film 113 on the TFT substrate 100 side.

In FIG. 2, when a signal voltage is applied between the pixel electrode 112 and the common electrode 110 formed on the TFT substrate 100, electric force lines are generated as indicated by arrows, so that liquid crystal molecules 301 are rotated to control light transmittance of the pixel. Light transmittance is controlled for each pixel to form an image.

FIG. 3 is an exemplary plan view of the pixel. In FIG. 3, the scanning lines 11 extend in the horizontal direction (x-axis direction) while being arranged in the vertical direction (y-axis direction). In addition, the video signal lines 12 extend in the vertical direction while being arranged in the horizontal direction. In FIG. 3, the pixel has a size of, for example, 11 μm in the horizontal direction and 33 μm in the vertical direction, the video signal line 12 has a width of about 2 μm, and the scanning line 11 has a width of about 2 μm. In FIG. 3, although the pixel electrode 112 exists in a region enclosed by the scanning lines 11 and the video signal lines 12, since the pixels have an extremely small horizontal pitch of 11 μm, the pixel electrode 112 overlaps part of the video signal line 12 and part of the metal line 109. In FIG. 3, the alignment direction AL, which determines the initial alignment of the liquid crystal, of the alignment film is the horizontal direction being the x-axis direction.

TFT as a switching element is formed on the upper side in the y-axis direction in FIG. 3. The TFT in FIG. 3 corresponds to the TFT in FIG. 2. One end of the semiconductor film 102 is connected to the video signal line 12 via the through hole 121. The video signal line 12 also serves as the drain electrode 106. The semiconductor film 102 bends in a U-shape and passes under the scanning line 11 twice. Since the scanning line 11 also serves as the gate electrode 104, two TFTs are resultantly formed in series.

The other end of the semiconductor film 102 is connected to the source electrode 107 via the through hole 122. The source electrode 107 extends toward the pixel electrode 112 and is connected to the pixel electrode 112 via the through hole 130 formed in the organic passivation film 108 and the through hole 131 formed in the capacitor insulating film 111. In FIG. 3, the pixel electrode 112 is indicated with various element names 1121, 1122, 1123, 1124, 1125, and 1126. Specifically, 1121 denotes five tooth portions of the comb electrode, 1122 denotes a backbone portion of the comb electrode, 1123 denotes a contact portion for connection to the source electrode 107, and 1124 denotes a portion that connects the contact portion 1123 to the tooth portion 1121 of the comb electrode and connects the contact portion 1123 to the backbone portion 1122 of the comb electrode.

The main part directly contributing to image formation is the tooth portions 1121 of the comb electrode. In FIG. 3, the five tooth portions 1121 of the comb electrode extend laterally (in the x-axis direction) from the backbone portion 1122. The side of each tooth portion 1121, extending in the horizontal direction, of the comb electrode has a predetermined angle with respect to the x-axis direction. Specifically, each tooth portion 1121 of the comb electrode has a width smaller at the tip than at the root thereof. This is to prevent generation of a domain during liquid crystal operation. The longitudinal width w4 of the tooth portion 1121 of the comb electrode is, for example, 1.8 μm in the center of the tooth portion 1121 in the x-axis direction, and the comb spacing w3 is, for example, 2.5 μm. The length in the x-axis direction of the tooth portion 1121 of the comb electrode is, for example, 8 μm. An inclined portion 1126 is formed at the root of a recess corresponding to the spacing between the tooth portions 1121 of the comb electrode. This is to prevent generation of a domain when liquid crystal is operated.

A notch 1125 having a roughly triangular shape is formed at a position corresponding to the tooth portion 1121 of the comb, on a side on the adjacent pixel side, of the backbone portion 1122 of the comb electrode. This is to prevent generation of a domain when the liquid crystal is operated, and increase response speed.

In FIG. 3, the common electrode 110 extends in a stripe shape in the horizontal (x-axis) direction, in correspondence to width in the y-axis direction of a region where the tooth portion 1121 of the comb electrode of the pixel electrode 112 is formed, so as to avoid the through hole 130 formed in the organic passivation film 108. The common electrode 110 has a width of, for example, 25 μm in the y-axis direction. The common electrode 110 has high resistance because of being formed of a transparent conductive film such as ITO and thus having lower conductivity than metal, and because of being formed thin to increase the transmittance. This causes luminance gradient on a screen.

To prevent this, in FIG. 3, a metal line 109 is formed so as to overlap the video signal line 12. Such a metal is hereinafter referred to as metal line 109. The metal line 109 is formed in a stacked manner with the common electrode 110 and thus has a common potential. In FIG. 3, the metal line has a width w2 of 4 μm, while the video signal line 12 has a width w1 of, for example, 2 μm. However, the video signal line 12 has the same width as the metal line 109 in a portion where the through hole 130 of the organic passivation film 108 is formed.

Figure 4:
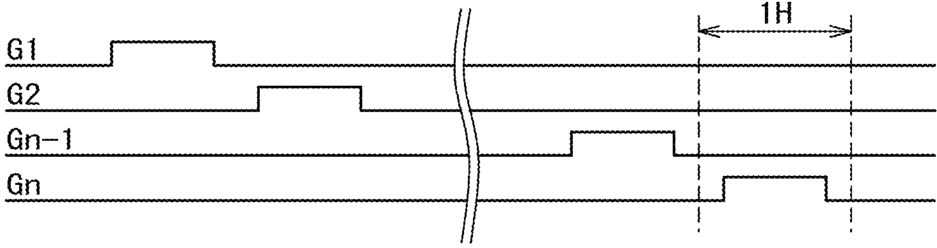
FIG. 4 shows a typical driving method of the liquid crystal display device.

FIG. 4 shows a typical driving method of the liquid crystal display device. A gate voltage is sequentially applied to the scanning lines 11 shown in FIG. 1 from the upper side of the display region 14. A video signal is written to pixels for one row during a period 1H where the gate voltage is ON. Although there are n scanning lines in FIG. 1, scanning lines G3 to Gn−2 are omitted in FIG. 4. In the driving method of FIG. 4, the backlight is still ON during writing of the video signal.

A liquid crystal display device used for VR and the like requires a high-resolution screen, excellent moving image characteristics, and high contrast. In typical operation of the liquid crystal display device, one data is maintained for one frame, and the next data suddenly appears when the frame changes. This causes blurring in a moving image.

In the liquid crystal display device, black display is performed by shielding light from the backlight with the liquid crystal display panel. However, since liquid crystal does not perfectly shield light, some leakage of light occurs. As a result, image contrast is reduced.

Figure 5:
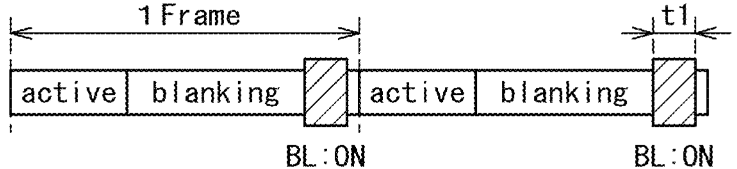
FIG. 5 shows an outline of a driving method according to a comparative example.

FIG. 5 shows an example of a driving method that addresses such problems, which is a comparative example of the invention. FIG. 5 shows an outline of the driving method of the comparative example, showing the method for two frames. One frame is divided into an active period and a blanking period. Video data is written during the active period and maintained unchanged. Liquid crystal is an elastic body and requires a certain amount of time for complete alignment. Liquid crystal molecules are thus fully aligned during the blanking period.

In FIG. 5, the backlight is OFF during most of the active and blanking periods. At the end of the blanking period, the backlight is ON only for a predetermined period t1. In one frame period, since the backlight is OFF except for the short time t1, black display is performed during this period. As a result, the driving method of FIG. 5 achieves a deep black level. In FIG. 5, BL: ON means that the backlight is ON. The same applies to the following figures.

Another feature of FIG. 5 is that an image is displayed only during a short period of time t1 in one frame, and no image is displayed during other periods. Consequently, there is a time interval of about one frame period (more precisely, one frame period—t1) between images, making it possible to sufficiently respond to a moving image and prevent blurring of a screen.

Figure 6:
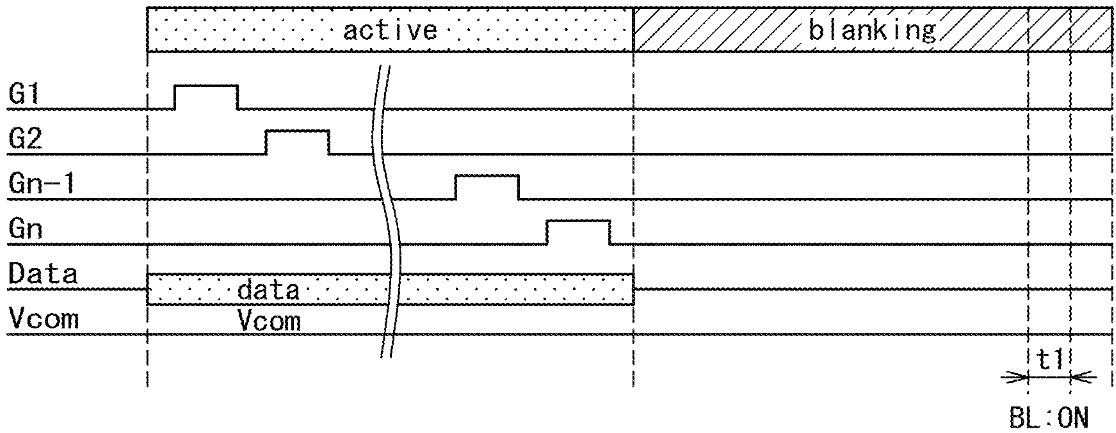
FIG. 6 shows a detailed diagram of the driving method according to the comparative example.

FIG. 6 is a time chart specifically showing the contents of FIG. 5 for one frame. In FIG. 6, the scanning lines G1 to Gn are sequentially scanned during the active period, and data signals (data) are written at the same time. On the other hand, a constant common voltage is applied to the common electrodes. At the end of the blanking period in FIG. 6, the backlight is ON only for a short time t1.

Figure 7:
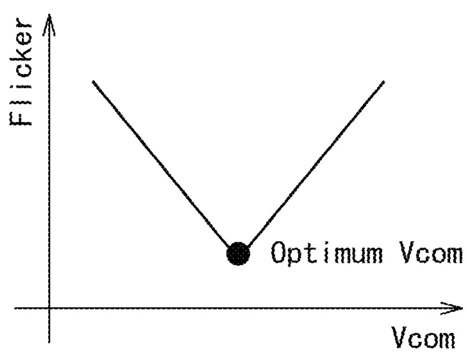
FIG. 7 shows definition of optimum Vcom.

In the liquid crystal display device, a reversed polarity signal is applied to the video signal line or the pixel electrode on a frame-by-frame basis. A constant voltage Vcom is applied to the common electrodes, and a value of the Vcom is set to a voltage at which flicker is least likely to occur. The voltage is called optimum Vcom. FIG. 7 is a graph showing such operation. In FIG. 7, the horizontal axis represents Vcom, and the vertical axis represents flicker. After the liquid crystal display device is operated, the Vcom, at which flicker is minimized, is set as the optimum Vcom.

The optimum Vcom problematically changes with operating time. As shown in FIG. 7, the initially set Vcom is applied to the common electrode. Whether the optimum Vcom has changed is therefore observed by the degree of flicker.

Figure 8:
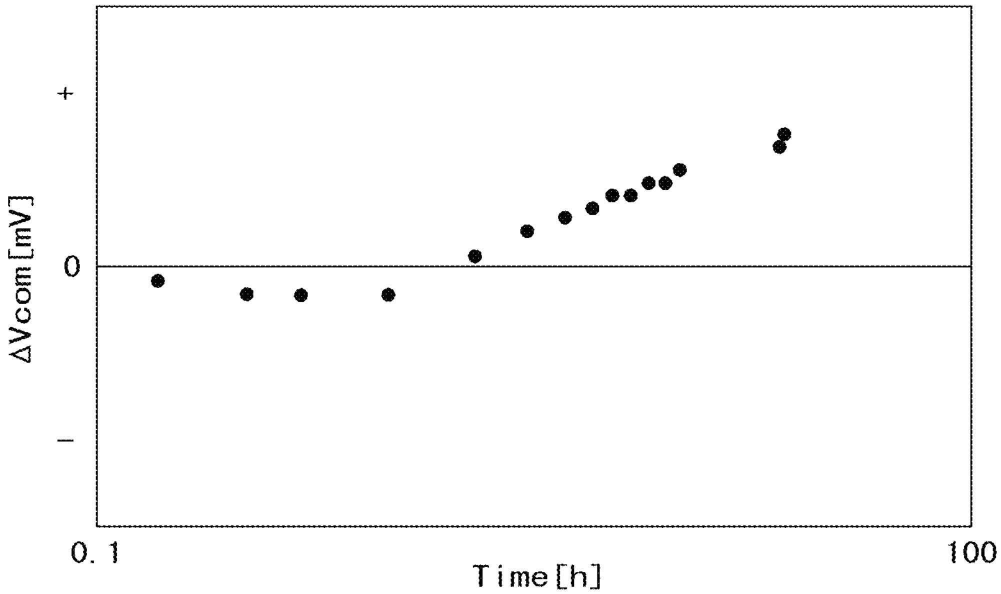
FIG. 8 shows an exemplary aging characteristic of the optimum Vcom.

FIG. 8 is a graph showing an example of a change in the optimum Vcom over time. In FIG. 8, the horizontal axis represents time on a log scale, and the vertical axis represents a change in the optimum Vcom. In FIG. 8, the optimum Vcom extremely slightly changes up to a few hours, but then gradually increases on the positive side as time increases. This phenomenon is irreversible, and the optimum Vcom is thus never returned to the original value.

Figure 9:
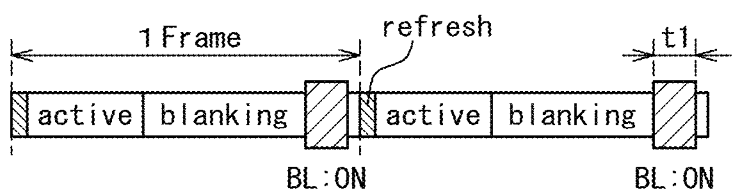
FIG. 9 shows an outline of a driving method according to a first embodiment.

The cause of such a phenomenon is not exactly known. However, the inventors have found that the change in the optimum Vcom can be reduced by a driving method of the liquid crystal display device. FIG. 9 shows an outline of the driving method according to the invention. The driving shown in FIG. 9 is basically the same as in the comparative example shown in FIG. 5. Specifically, one frame includes an active period as a period for writing video data, and a blanking period for sufficiently aligning the liquid crystal molecules, and the backlight is ON only for a short period t1 at the end of the blanking period. As a result, high contrast and excellent moving image reproduction characteristics can be achieved. FIG. 9 is different from FIG. 5 showing the comparative example in that gate voltages of all TFTs, i.e., voltages of all scanning lines, are set to an ON (High) or OFF (Low) value for a short time before start of the active period.

Figure 10:
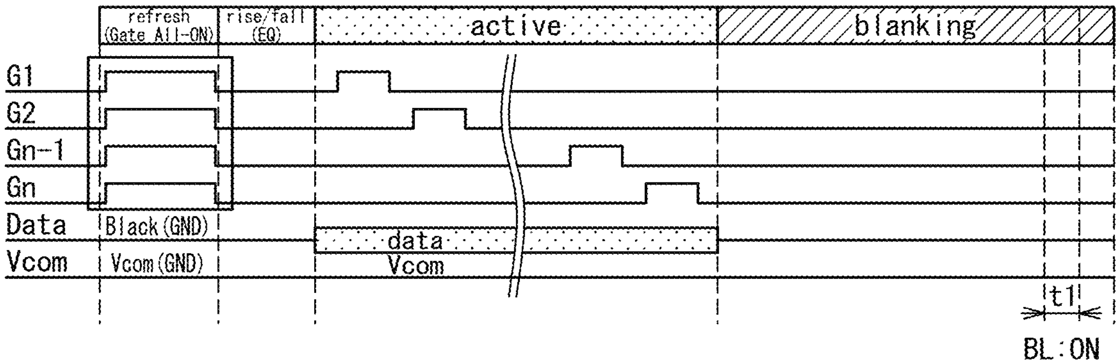
FIG. 10 is a detailed diagram of the driving method according to the first embodiment.

FIG. 10 is a time chart specifically showing the contents of FIG. 9 for one frame. In FIG. 9, the scanning lines G1 to Gn are sequentially scanned during the active period, and data signals (data) are written at the same time. On the other hand, a constant common voltage is applied to the common electrodes. The backlight is ON only for a short time t1 at the end of the blanking period in FIG. 9. FIG. 10 is different from FIG. 6 showing the comparative example in that gate voltages of all TFTs, that is, voltages of all scanning lines, are set to an ON (High) or OFF (Low) value for a short time before start of the active period. In FIG. 10, the short time is referred to as refresh period.

In FIG. 10, a rise-and-fall period of the gate voltage, called equalizer (EQ) period, is shown in addition to the refresh period. However, since the EQ period is generally set short, when referring to the refresh period in graphs other than FIG. 10, the term refresh period includes the EQ period.

Figure 11:
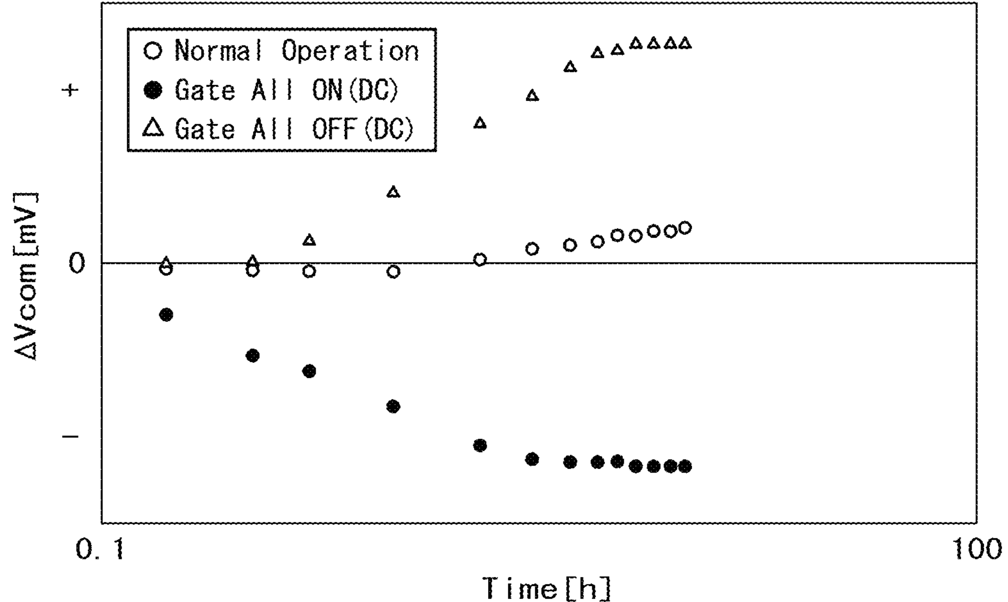
FIG. 11 is a graph showing a relationship between a type of voltage applied to all scanning lines in a refresh period and Vcom shift.

As for the voltage of the gate electrode in the refresh period, there are a case where all scanning line voltages are fixed at Low and a case where the voltages are fixed at High. FIG. 11 shows a graph obtained by investigating whether High or Low is better as a value of the gate voltage to be fixed. In FIG. 11, the horizontal axis represents time, and the vertical axis represents shift amount of the optimum common voltage.

In FIG. 11, each open circle indicates the shift amount in normal operation. After several hours or more of operation, the shift amount increases on the positive side. This is the same as in FIG. 8. Each triangle in FIG. 11 indicates the shift amount of the optimum common voltage when the Low voltage is applied to the gate electrode for the entire period instead of normal operation. In this specification, the Low voltage is applied to the gate electrode during the period of time shown on the horizontal axis, and only during measurement, the optimum common voltage is investigated in normal operation to measure the shift amount of the optimum common voltage. In this specification, the optimum common voltage shifts in the positive direction with time.

Each black circle in FIG. 11 indicates the shift amount of the optimum common voltage when the High voltage is applied to the gate electrode for the entire period instead of normal operation. In this specification, the High voltage is applied to the gate electrode during the period of time shown on the horizontal axis, and only during measurement, the optimum common voltage is investigated by normal operation to measure the shift amount of the optimum common voltage. In this specification, the optimum common voltage shifts in the negative direction with time.

In FIG. 11, when a negative voltage is continuously applied to the gate electrode as in the triangular specification, an effect of amplifying a change in optimum common voltage in normal operation is produced. On the other hand, when a positive voltage is continuously applied to the gate electrode as in the black circle specification, an effect of canceling a change in the optimum common voltage in normal operation is produced. This suggests that the voltage, which is applied to the gate electrode during the refresh period shown in FIG. 9 or 10, can be set to a High potential to reduce the shift amount of Vcom in normal operation.

Figure 12:
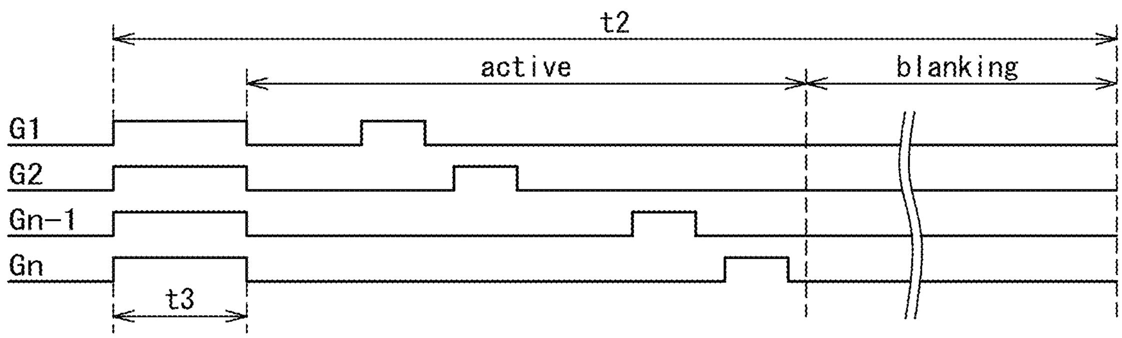
FIG. 12 shows a definition of an exemplary specification for investigating a relationship between a voltage application period and the Vcom shift when a constant voltage is applied to all scanning lines in the refresh period.
Figure 13:
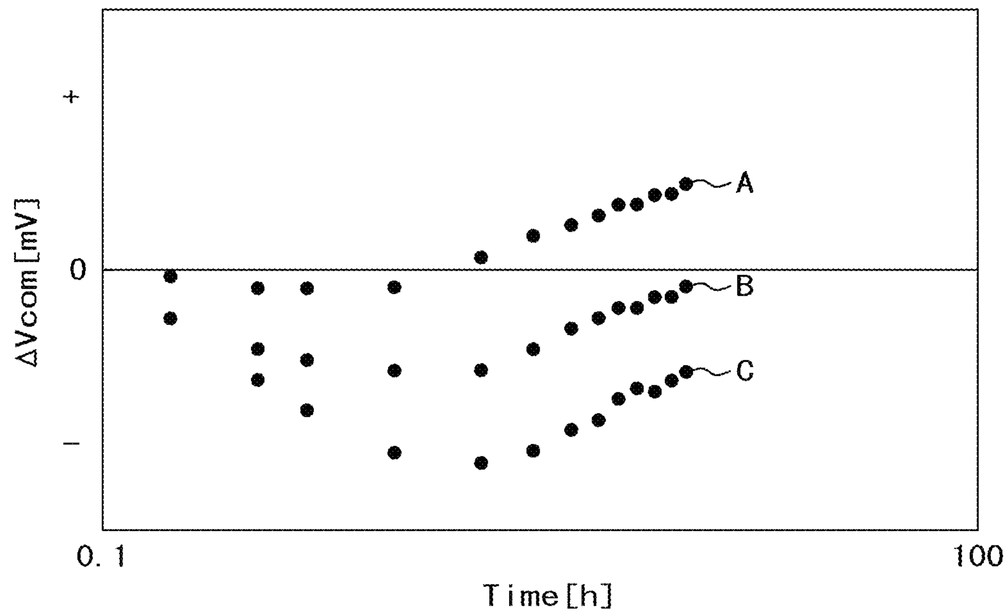
FIG. 13 is a graph showing the relationship between the voltage application period and the Vcom shift when a constant voltage is applied to all scanning lines in the refresh period.

FIGS. 12 and 13 show a relationship between the refresh period and the Vcom shift when all gate electrodes are fixed at High in the refresh period of FIG. 10. FIG. 12 shows the measurement condition, and FIG. 13 shows results of the measurement.

The top diagram in FIG. 12 shows a timing chart for one frame period. In this timing chart, one frame has a period of t2, and all scanning lines are set at High for a period t3. At this time, frame frequency is 90 Hz, and one frame period is 11.111 msec.

The table in FIG. 12 shows definitions of relative specifications A, B, and C in FIG. 13. FIG. 13 shows Vcom shift evaluated for each of the specifications A, B and C. The table in FIG. 12 and FIG. 13 are described together below. In FIG. 13, the horizontal axis represents time in a log scale, and the vertical axis represents the shift amount of Vcom.

In FIGS. 12 and 13, the specification A corresponds to a case where the invention is not used, i.e., no refresh period is provided. A of FIG. 13 shows behavior in this case. The behavior is the same as in FIG. 8, where Vcom shift substantially does not occur up to a few hours of operation, but gradually increases after a certain time.

The specification B corresponds to a case where a refresh period t3 is 0.05 msec. In this case, refresh period (t3)/one frame period (t2) is 0.45%. As shown in B of FIG. 13, in the specification B, the optimum Vcom gradually shifts to a more negative side for several hours, but then gradually shifts toward the positive side. Vcom is expected to shift into the positive side when the operating time exceeds a certain time.

The specification C corresponds to a case where a refresh period t3 is 1 msec. In this case, refresh period (t3)/one frame period (t2) is 9%. As shown in C of FIG. 13, in the specification C, the shift amount is large compared to the specification B, but tendency of Vcom shift is similar to the specification B. That is, the optimum Vcom gradually shifts to a more negative side for several hours, but then gradually shifts toward the positive side. For the specification C, Vcom is expected to shift into the positive side when the operating time exceeds a certain time. However, compared to the specification B, it is expected to take a longer period for Vcom to exceed zero.

As described above, the Vcom shift can be controlled by applying a High-level voltage to all scanning lines for a predetermined period. In addition, the relationship between the amount of Vcom shift and the operating time can be predicted, so that the refresh condition can be set in relation to product life.

Although the countermeasure against Vcom shift according to the present invention has been described above with the case where the liquid crystal display device having the structure shown in FIGS. 1 to 3 is driven as shown in FIGS. 9 and 10, the configuration of the invention is not limited thereto. For example, frame frequency of a product as shown in FIG. 12 may not be limited to 90 Hz, but may be a different frequency according to product characteristics. Similarly, the refresh period t3 can be set to any appropriate condition according to product characteristics. At this time, considering that the liquid crystal display device is used for VR with high resolution, fast response, and high contrast, it is not practical that refresh period (t3)/one frame period (t2) is set large. For example, refresh period (t3)/one frame period (t2) is preferably set in a range from 0.006 to 12. Further, for example, when the liquid crystal display device has another structure or is driven by another driving method, the Low voltage, rather than the High voltage, may be preferably applied to all scanning lines in the refresh period depending on purposes.

Although the High or Low level of the scanning signal is used as the refresh voltage in the above description, another DC voltage may be generated in the circuit and used, for example. This may enable more precise control.

What is claimed is:

1. A liquid crystal display device comprising:

scanning lines extend in a first direction and arranged in a second direction, video signal lines extend in the second direction and arranged in the first direction, pixels formed in respective regions enclosed by the scanning lines and the video signal lines, a pixel electrode and a thin-film transistor (TFT) formed in each of the pixels, and a first insulating film formed between a common electrode formed in common for a plurality of pixels and the pixel electrode, wherein the pixel electrode is connected to one of the video signal lines via the TFT, the TFT has a gate connected to one of the scanning lines, a constant common voltage is supplied to the common electrode, the scanning lines are sequentially scanned from a first scanning line in one frame, the one frame is divide into a refreshing period that a predetermined voltage is applied to all the scanning lines before a scanning signal is applied to the first scanning line, a blanking period to maintain data written to each pixel, and an active period to scan the scanning lines.

2. The liquid crystal display device according to claim 1, wherein the predetermined period includes a period in which voltages of all the scanning lines are changed from a Low level of the scanning signal to the predetermined voltage, and a period in which the voltages of all the scanning lines are changed from the predetermined voltage to the Low level of the scanning signal.

3. The liquid crystal display device according to claim 1, further comprising a backlight, wherein the backlight is ON during a portion of the blanking period.

4. The liquid crystal display device according to claim 1, wherein the predetermined voltage corresponds to a signal at the same level as a High level of the scanning signal.

5. The liquid crystal display device according to claim 1, wherein the predetermined voltage corresponds to a signal at the same level as the Low level of the scanning signal.

6. The liquid crystal display device according to claim 4, wherein the predetermined period is 0.006% to 12% of a period of the one frame.

7. The liquid crystal display device according to claim 1, wherein the video signal line applied to the pixel electrode is driven by column inversion driving.

* * * * *